(No Model.) 4 Sheets—Sheet 3.
D. M. EDDY.
SUSPENSION BRIDGE.
No. 438,070. Patented Oct. 7, 1890.
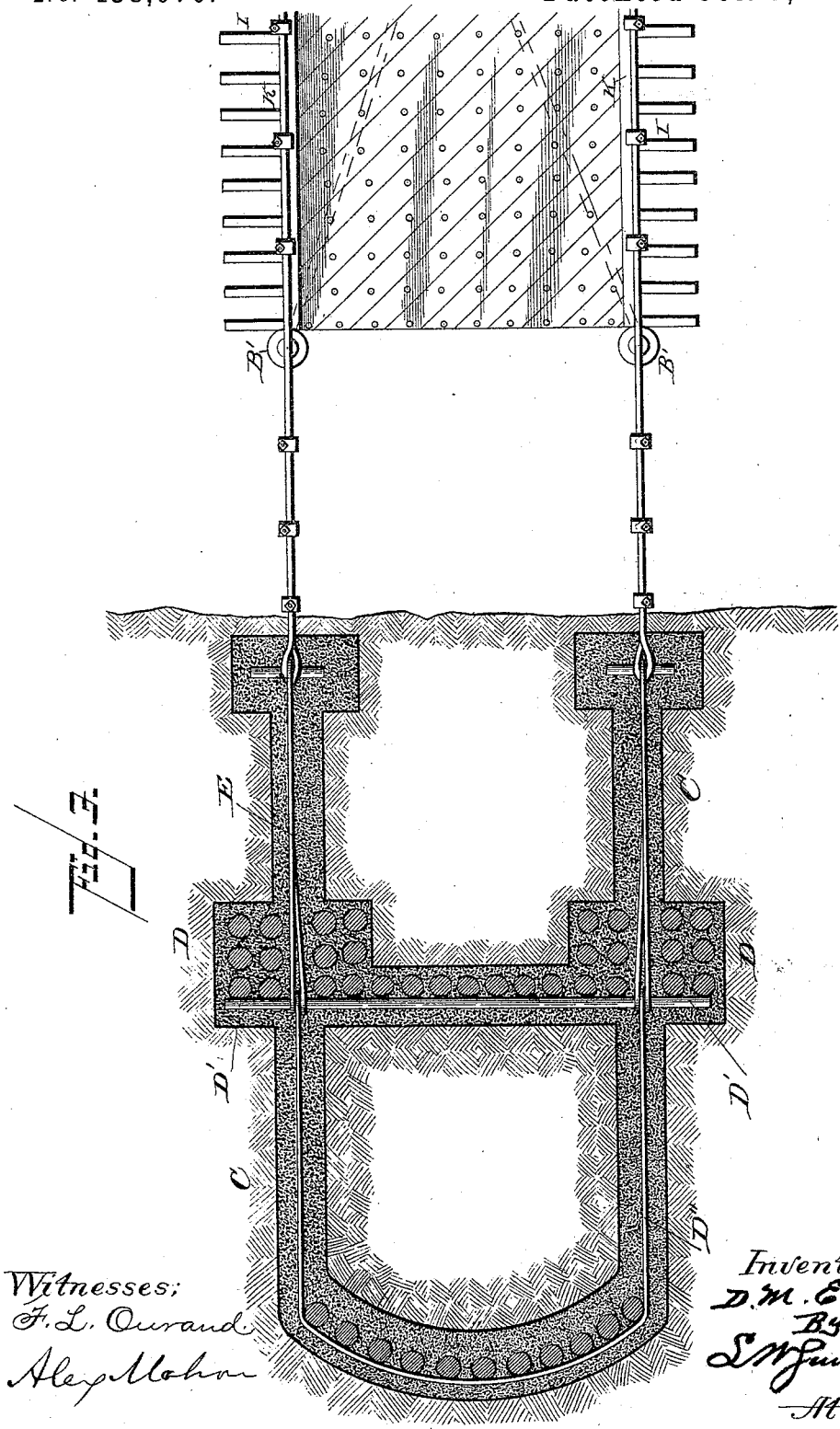
Witnesses:
F. L. Ourand
Alex Mohn
Inventor:
D. M. Eddy
By
L. W. Gunsabaugh
Attorney.

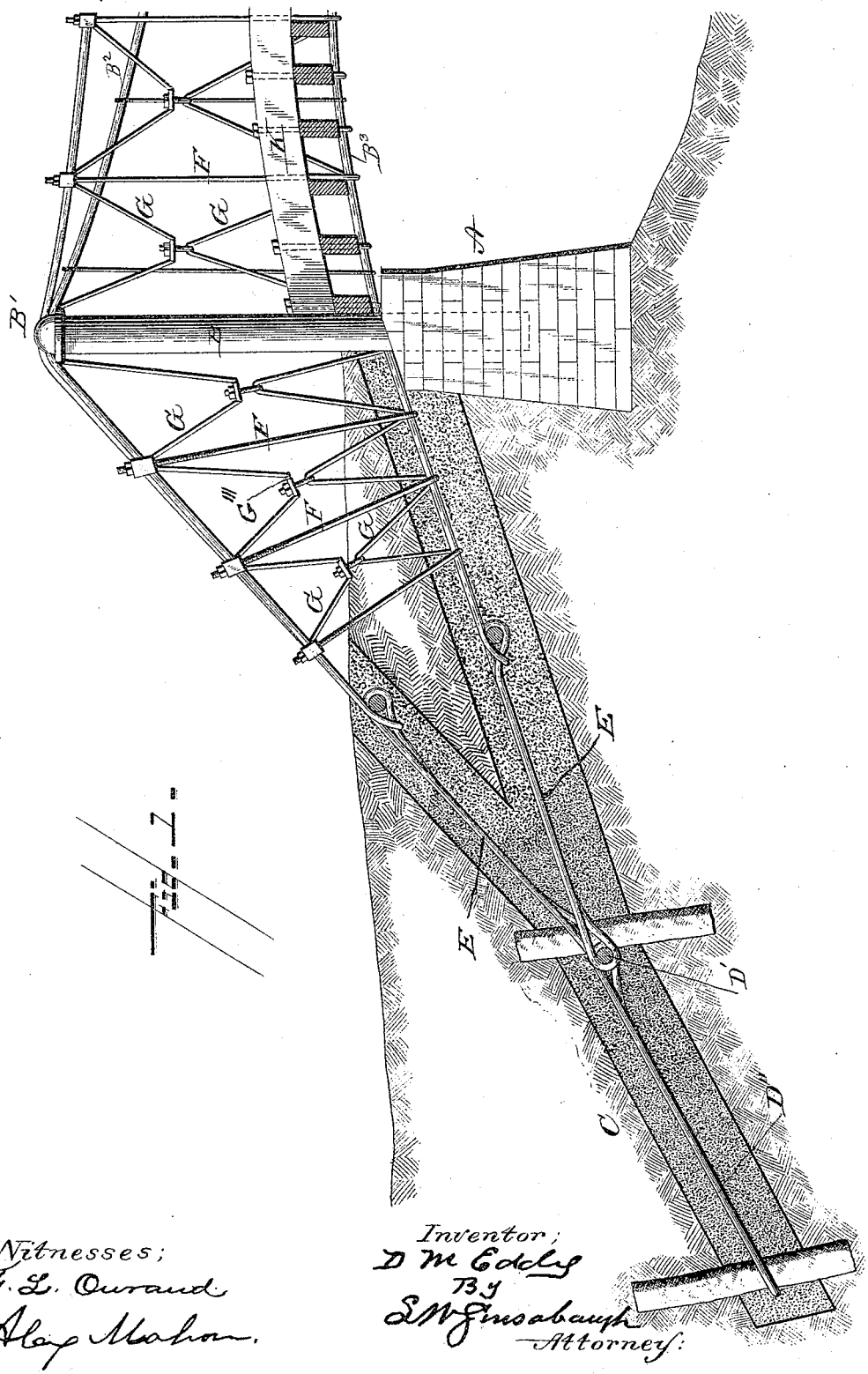

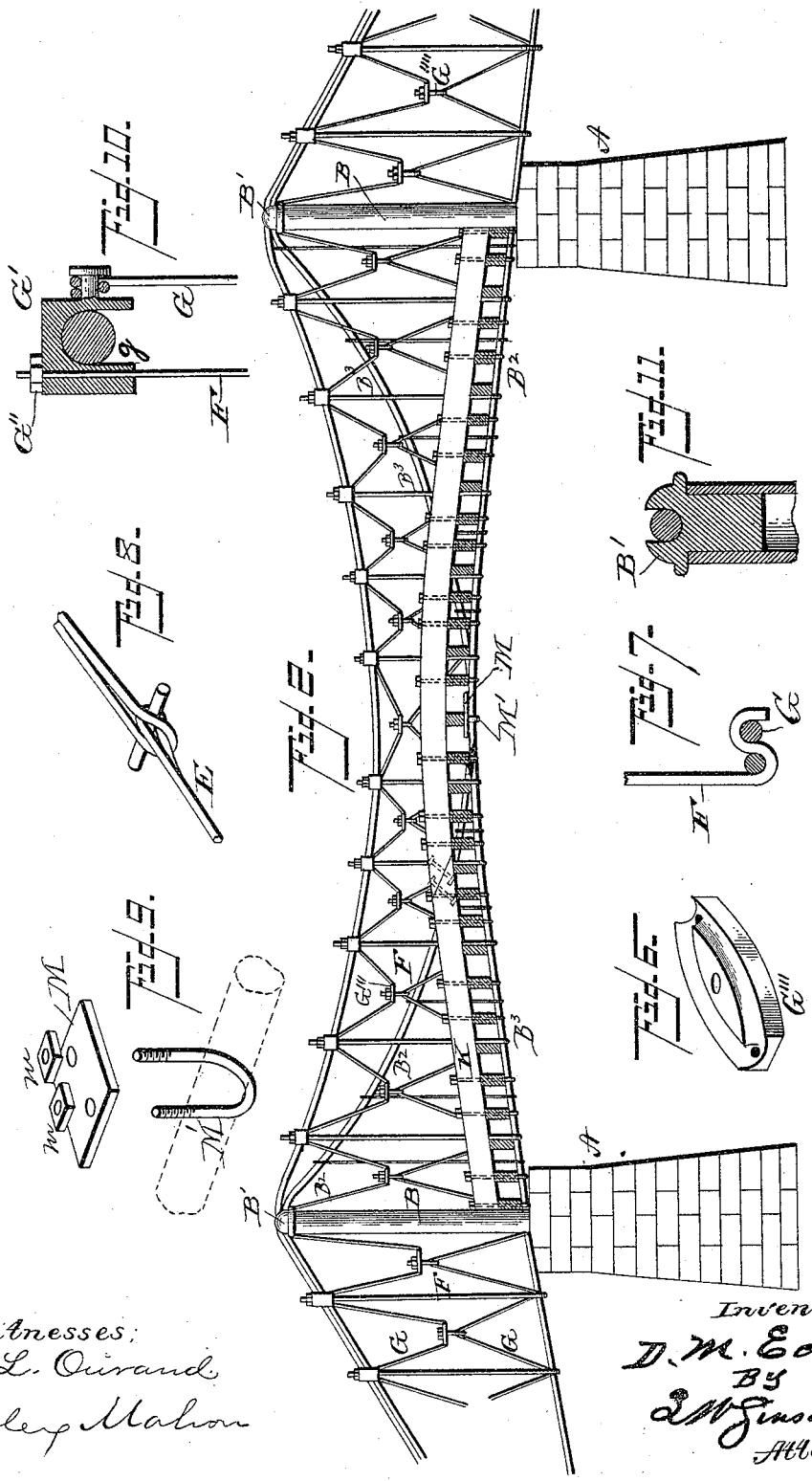

(No Model.) 4 Sheets—Sheet 4.
D. M. EDDY.
SUSPENSION BRIDGE.
No. 438,070. Patented Oct. 7, 1890.
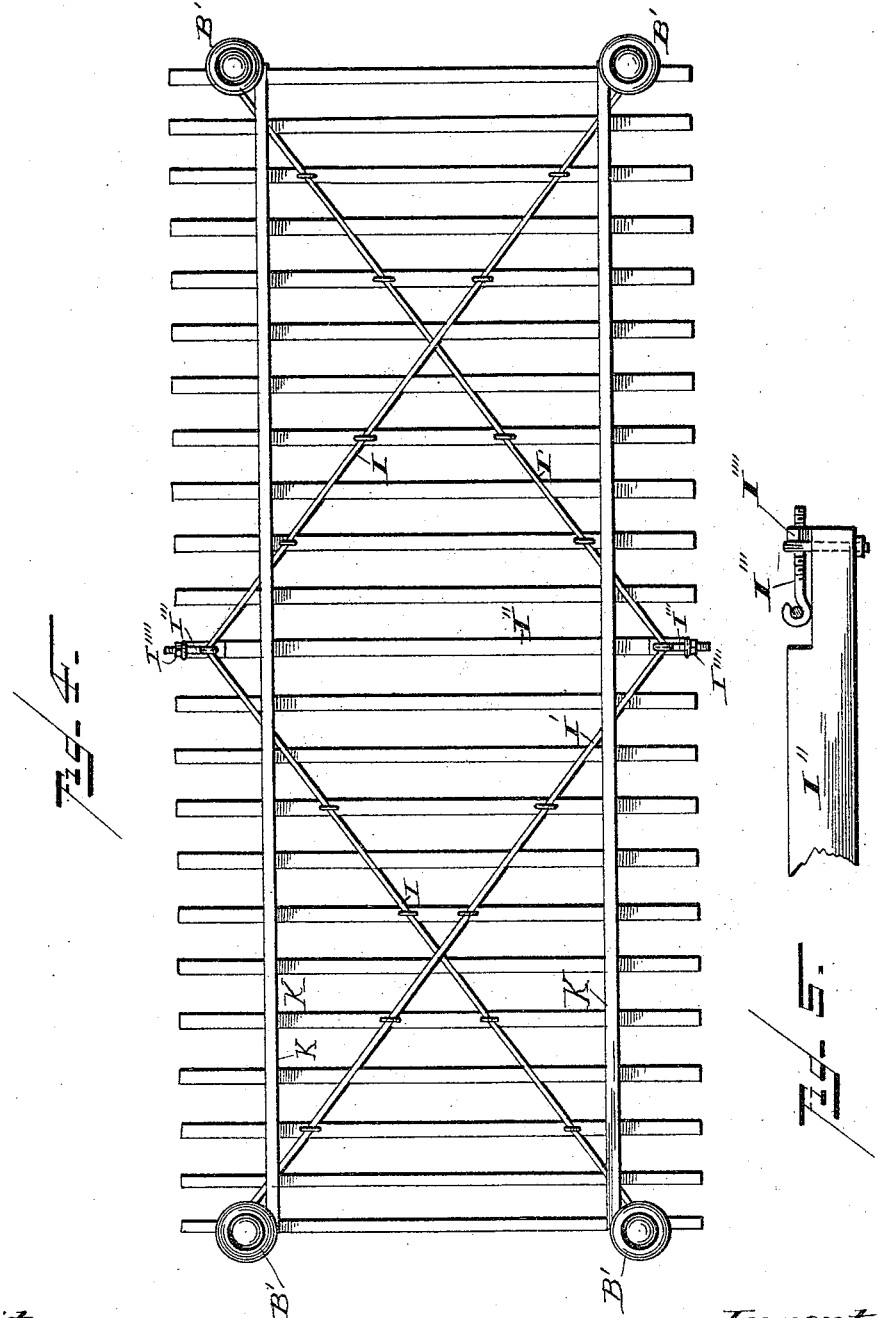
Witnesses.
F. L. Ourand
Alex Mahon
Inventor
D. M. Eddy
By
L. M. Ginsabaugh
Attorney.

UNITED STATES PATENT OFFICE.

DANIEL M. EDDY, OF PUEBLO, COLORADO.

SUSPENSION-BRIDGE.

SPECIFICATION forming part of Letters Patent No. 438,070, dated October 7, 1890.

Application filed October 15, 1889. Serial No. 327,051. (No model.)

*To all whom it may concern:*

Be it known that I, DANIEL M. EDDY, a citizen of the United States, residing at Pueblo, in the county of Pueblo and State of Colorado, have invented new and useful Improvements in Bridges; and I do hereby declare the following to be a full, clear, and exact description of said invention, reference being had to the accompanying drawings, and to the letters of reference marked thereon, which form a part of this specification.

My invention relates to improvements in cable bridges, and especially as an improvement on Letters Patent granted to me September 18, 1888, No. 389,694.

My invention consists in a novel manner of anchoring the cables and to certain novel features in the construction and arrangement of parts, all as hereinafter explained.

In the accompanying drawings, Figure 1 is a view of one end of the bridge, showing the manner of anchoring the cables. Fig. 2 is a similar view on a smaller scale. Fig. 3 is a horizontal section showing the manner of connecting the cables with the anchors. Fig. 4 is a plan or top view of a portion of the bridge, showing the lateral trussing-cables and the manner of adjusting the same. Fig. 5 is a side view of the device for adjusting said trussing-cables. Fig. 6 is a perspective view of the plate used in connecting the truss-wires to each other. Fig. 7 is a side view of the lower end of the tie-rod, showing the manner of connecting the same to the cable. Fig. 8 is a perspective view of the cables, showing the manner of connecting the same with the anchor-bar. Fig. 9 is a perspective view of the plate for connecting the cables at the point of crossing in the center. Fig. 10 is a sectional view of the head or plate to which the truss-rods are connected; and Fig. 11 is a section of the pillar, showing the saddles for supporting the cables.

In the drawings, A represents a suitable abutment of masonry, which forms the support for the pillars B, over and through which the several cables pass, which consist of the two main cables $B^2$ $B^3$ and a banister-cable $B^4$ on each side, the banister-cables being supported in suitable saddles B', fitting the upper portion of the pillars. The main cables extend from side to side of the bridge, one end of each cable passing over and being supported in the saddle B', while the other end passes through the lower end of the pillar on the opposite side and crossing each other at or near the center of the bridge, and said cables being secured together at the point of crossing by means of a plate M, staple M', and nuts $m$ $m$, as shown in Fig. 9; but any other means may be employed, as shall be found most desirable.

The cables are anchored in the following manner: A trench C is dug extending downward and backward from the abutment in U form, with an intermediate cross-trench D. In both of the cross-trenches are driven piles, and the trench filled around the piles and cable with a cement or concrete. The cables extend back and are looped around the anchoring-cables E, which are connected to short bars on each side. A bar or main anchor D' is embedded in the concrete behind the piles in the cross-trench, around which bar the anchoring-cable is passed, and to this bar is connected a U-shaped secondary anchoring-cable D", which cable is connected to each side of the main anchor, and lies in the U-shaped trench, which trench is also filled with piling or anchoring-posts and filled in with concrete.

The object of the secondary cable is to give greater permanency to the main anchor, and by extending the main anchor through the cross-trench and carrying the secondary cable around the line of piling in the U-shaped trench it will be seen that the strain is distributed over a greater amount of surface.

Instead of using the ordinary piles, I may employ iron or other forms of posts.

By using the piling and filling in and around the cables and piles with concrete it will be seen that the piles will be caused to firmly anchor the bridge until the concrete has become fully set, and that if from any cause the piling should become rotten or decayed the concrete will be then so firmly set as to fully sustain and firmly anchor the cables.

The cables are six in number, three on each side, two main cables and one banister-cable, and each of the two main cables and banister-cables are connected together by tie-rods F and truss-rods or cables G in the following manner: The rods are made at the lower end in double or reverse hook form, one of which hooks engages the lower cable, the other one being engaged by the trussing-cable. The rod is provided at its upper end with a cast plate G', connected to the banister-cable by means of a groove g on its under side, which fits over the banister-cable. The rods are provided with screw-threaded ends, which rods, after passing through the heads, are provided with adjusting-nuts G'', by means of which the tension of the rods on the cables may be adjusted and regulated to preserve the proper alignment of the bridge at any time.

The truss-wires G are made in continuous lengths to extend from end to end of the bridge, the upper wire being first connected to the cast plate G', and thence extending down to and engaged with a grooved adjusting-plate G'''. The truss-wires are composed of two or a series of wires in compound form, being divided so as to have a part thereof lie in the groove on each side of the point of connection with the adjusting-hook. The plate G''' is in turn connected with the lower truss-wires by means of an adjusting-hook G'''', the loops in the wires each extending to a point centrally between the banister and lower portions of the main cables.

If desirable, instead of using the continuous trussing-cable, truss-rods may be employed, in which case the upper truss-rods, after being connected with the plate G', may then pass through perforations in the adjusting-plate and be secured thereto in any preferred way. It will thus be seen that by means of the cast plate and truss-wires, and also the truss-rods, the same may be adjusted properly relatively to each other and the proper alignment of the bridge provided for at all times.

To strengthen and hold the bridge laterally, I connect to the pillars bracing-cables I I', secured to the pillars on the same side, but having a connection centrally with one of the girders I'', so that the wires cross each other about midway between the center and ends of the span.

To provide for the adjustment of the wires I I', a hook I''' is connected to the girder passing through a lug I'''' and having its screw-threaded end engaged by a nut, as shown, by which means the tension on the cable may be regulated. These lateral truss-cables are placed upon the upper surfaces of the floor-beams, and are embedded into said floor-beams, so that the floor shall rest solidly on the beams, and said cables are secured by means of staples passing over the same and engaging the floor-beams.

Side stringers K are employed extending from end to end of the bridge and have connected thereto the intermediate floor-beams between the rods, and thus preserve the alignment of the bridge and serve to distribute the weight throughout the length of the same, and also add very materially to the solidity and appearance of the bridge.

Having described my invention, what I claim as new, and desire to secure by Letters Patent, is—

1. In a cable bridge, the combination of the trench having the side and cross openings with the piling or anchoring-posts, and the concrete or filling to surround the anchoring-cable and piling, substantially as described.

2. In a cable bridge, the combination of the main anchoring-cables, the anchoring-bar, and the secondary U-shaped cable with the main and secondary trenches and the concrete filling, substantially as described.

3. The combination, with pillars, of the cross-floor or trussing-cables connected to said pillars at each end and having a central connection with the bridge at the center upon the opposite side of its connection with the pillars, substantially as described.

4. The combination, with the pillars, of the cross-floor or trussing-cables connected thereto and the central adjustable connection for regulating the tension thereof, substantially as described.

5. In a cable bridge, the floor-beams having the cross-floor or lateral trussing-cables laid upon and made fast with said floor- am substantially as described.

6. In a cable bridge, the main cables, two on each side, crossing near the center, combined with a banister-cable, substantially as described.

7. In a cable bridge, the main cables, two on each side, each having one end running over the pillar and the other through the same, and crossing each other near the center, combined with the banister-cable and the tie and truss rods or cables, substantially as described.

8. The combination, with the main and banister cables, of the tie-rods connected to the banister-cable through an adjustable connection and having the double-hooked lower end to receive the trussing rod or wire, substantially as described.

9. In a cable-bridge, the main cables extending from end to end of the bridge, in combination with a cable-truss connected to the banister-cable and to the lower portion of each main cable and extending throughout the length of the banister-cable, substantially as described.

10. In a cable bridge, the combination, with the main cables crossing each other, of the banister-cable truss connecting the main cables and banister-cable and extending throughout the length of said cables, substantially as described.

11. In a cable bridge, the lower cables, the banister-cable, the trussing rods or wires depending from the banister-cable and the trussing rods or wires connected with and extending from the lower cable, said trussing rods or wires connected with each other by an adjustable connection, substantially as described.

12. In a cable bridge, the banister-cable, the tie-rods connected thereto, the lower cable connected therewith, the longitudinal stringers, and the cross-ties, substantially as described.

13. In a cable bridge, the longitudinal stringers K, extending from end to end of the bridge, in combination with the floor-beams supported by the lower portions of the main cables through the tie-rods, and the intermediate beams supported by the stringers, substantially as and for the purpose set forth.

In testimony whereof I affix my signature in the presence of two subscribing witnesses.

DANIEL M. EDDY.

Witnesses:
ALEX. MAHON,
H. M. STERLING.